UNITED STATES PATENT OFFICE.

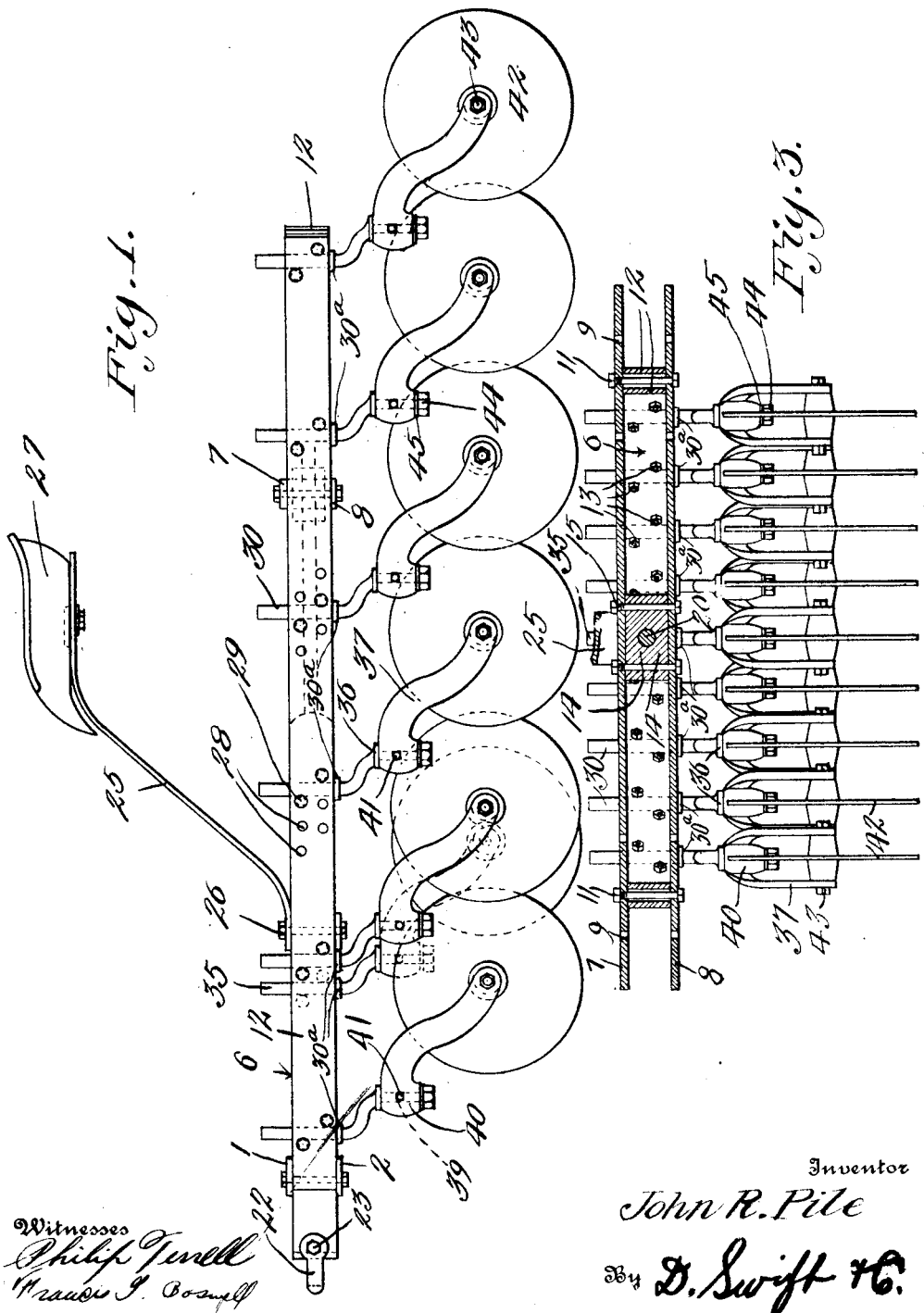

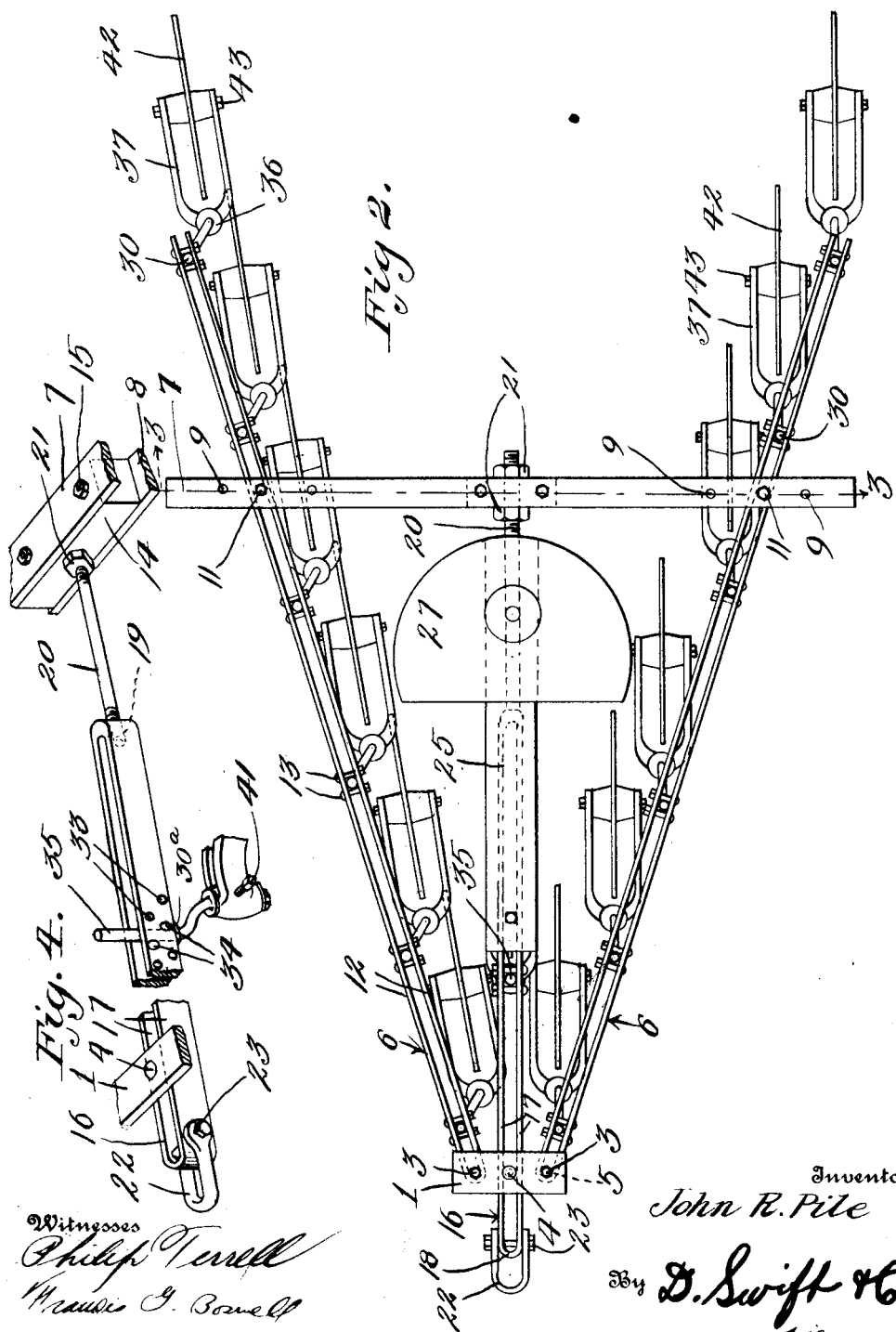

JOHN R. PILE, OF OWENSBORO, KENTUCKY.

DISK HARROW.

1,120,158. Specification of Letters Patent. Patented Dec. 8, 1914.

Application filed June 22, 1914. Serial No. 846,528.

*To all whom it may concern:*

Be it known that I, JOHN R. PILE, a citizen of the United States, residing at Owensboro, in the county of Daviess and State of Kentucky, have invented a new and useful Disk Harrow; and I do hereby declare the following to be a full, clear, and exact description of the invention, such as will enable others skilled in the art to which it appertains to make and use the same.

This invention relates to an improved disk harrow, and as one of the objects of the invention it is the aim to improve and render more efficient the construction of harrow illustrated, set forth, and claimed in the patent issued November 23, 1886, No. 353,001.

Another object of the invention is the provision of diverging bars, the rear portions of which are adjustable laterally and toward one another, and on each of which the disk holders are longitudinally adjustable, and each holder relative to its angular pivot pin is adjustable laterally and pivotally. A disk harrow constructed in accordance with these features may more efficiently perform its work in harrowing a field.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of the improved harrow constructed in accordance with the invention. Fig. 2 is a plan view, showing every disk of one side of the frame adjusted laterally upon its pivot, and showing every two of the disk harrows of the opposite side adjusted closer together than the disks of the other side. Fig. 3 is a sectional view on line 3—3 of Fig. 2. Fig. 4 is an enlarged detail view of the draft link of the forward apex end of the frame and the rear transverse bars thereof, showing a disk harrow adjustably carried thereon.

Referring to the drawings, 1 and 2 designate the two correspondingly shaped plates, connected by the bolts 3 and 4. The bolts 3 also pass through the looped ends 5 of the beams 6, thereby pivotally connecting said beams between the plates 1 and 2. These beams diverge rearwardly and spread apart, as shown in plan view. Plates 7 and 8 having apertures 9 are provided, through any one of which apertures at each end of said plates 7 and 8 a bolt 11 extends. Each beam 6 comprises two bars 12 integrally connected, to form the loop 5. These bars 12 are spaced apart from each other, but are parallel and are connected by the bolts 13. The bolts 11 pass not only through the plates 7 and 8, but through the space between the bars 12, thereby connecting the beams 6 in such wise to permit them to be adjusted relatively toward each other. By loosening the bolt 11, the plates 7 and 8 may be moved toward the plates 1 and 2, in which case the diverging rear end portions may be adjusted farther apart. By moving the plates 7 and 8 rearwardly, the beams may be brought nearer together at their rear portions. By removing one or another or both of the bolts 11 and inserting them in other of said apertures 9, the beams 6 may be adjusted toward and from one another. A block 14 is bolted at 15 between the plates 7 and 8. A central beam 16, which comprises the two bars 17 and terminates in a loop 18 at one end and a threaded opening 19 at the other end is provided. In the threaded opening 19 a screw 20 is threaded, which in turn passes through the block 14, there being nuts 21 for holding the screw 20 adjusted relative to the beam 16 and the plates 7 and 8, so as to provide a rigid structure. A clevis member 22 is bolted at 23 to the loop end of the beam 16, and to the clevis member a suitable evener or equalizer (not shown) may be connected, whereby draft animals may be connected to the harrow. The bolt 4 passes between the two bars 17 of the beam 16, thereby holding the forward portion of the beam 16 in position. As shown a spring bar 25 is bolted at 26 to the central beam 16, and is provided with a seat 27 for the operator.

The bars 12 of the beam 6 are provided with a plurality of apertures 28 arranged in groups, each group consisting of two pair, either pair of which receive bolts 29, between which the upper shank 30 of an angular pin is arranged, so as to hold the pin in place, but swivelly. One bolt of each pair is offset from the other bolt, so that the pin is held vertical. In order to insure a proper swivel movement and mounting of the pins 30, they are provided with collars 30$^a$ engaging just below the bars 12, as shown in the drawing. The bars 17 of the central beam are likewise provided with apertures 33 arranged in pairs for the reception of the bolts 34 to hold a pin 35 in a manner similar to the pins 30. Each pin 30 and the pin 35 are provided with spaced apart collars 36, between which the disk holders 37 are arranged. The lower shank of each pin 31 passes through the aperture 39 of the enlarged portion 40 of each holder, there being a set screw 41 for holding each holder at an angle to the pin, whereby each harrow disk may cut a broader trench. The holders 37 are forked, as shown in plan view, and in said forks the harrow disks 42 are mounted, by virtue of the bolts 43. Also to hold the holders in place upon the lower ends of the pins 31 are nuts and washers 44 and 45. It will be observed that by swivelly mounting the pins 31 between said bars 12 of the beams 6, the harrow disks are automatically self-alining. In other words, by this construction the harrow disks are allowed to assume their own relative positions, that is, swivelly with each other, but owing to their individual adjustments relative to the pin, each harrow disk may be adjusted in an angle relative to the pin, and by virtue of this angular adjustment, the disks are allowed to cut wider trenches, and owing to the swiveled connections of the pin, the disks are self-adjustable relative to each other, which will cause the trenches, whether cut wide or narrow, to be somewhat irregular relative to each other.

The invention having been set forth, what is claimed as new and useful is:—

1. In combination, a harrow frame comprising rearwardly diverging side beams, a plurality of angular pins, each being loosely mounted in the side beams for free swivel movement, the lower portion of each pin having a stationary collar and a removable collar and nut, a disk holder mounted upon the lower end of each pin between said collars and provided with a harrow disk, and means for adjusting the holder relative to the pin.

2. In combination, a harrow frame comprising rearwardly diverging side beams, each having two parallel bars, a plurality of pins, each being individually loosely mounted between the bars of each beam for free swivel movement, means for adjusting said pins longitudinally of the beams, a disk holder including a harrow disk being journaled upon the lower end of each pin, and a device for holding each holder in adjusted positions relative to the pin.

In testimony whereof I have signed my name to this specification in the presence of two subscribing witnesses.

JOHN R. PILE.

Witnesses:
　J. W. DANIEL,
　GROVER C. HILL.